United States Patent
Hooli et al.

(10) Patent No.: US 9,350,509 B2
(45) Date of Patent: May 24, 2016

(54) SCHEDULING REQUEST ENHANCEMENTS

(75) Inventors: Kari Juhani Hooli, Oulu (FI); Kari Pekka Pajukoski, Oulu (FI); Frank Frederiksen, Klarup (DK); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 168 days.

(21) Appl. No.: 14/113,895

(22) PCT Filed: May 2, 2011

(86) PCT No.: PCT/EP2011/056912
§ 371 (c)(1),
(2), (4) Date: Oct. 25, 2013

(87) PCT Pub. No.: WO2012/149953
PCT Pub. Date: Nov. 8, 2012

(65) Prior Publication Data
US 2014/0050185 A1    Feb. 20, 2014

(51) Int. Cl.
*H04L 12/70* (2013.01)
*H04L 5/00* (2006.01)
*H04L 1/16* (2006.01)
*H04L 1/18* (2006.01)
*H04W 72/12* (2009.01)

(52) U.S. Cl.
CPC ............ *H04L 5/0053* (2013.01); *H04L 1/1671* (2013.01); *H04L 1/1858* (2013.01); *H04W 72/1284* (2013.01); *H04L 5/0055* (2013.01); *H04L 5/0094* (2013.01)

(58) Field of Classification Search
None
See application file for complete search history.

(56) References Cited

U.S. PATENT DOCUMENTS

| | | | |
|---|---|---|---|
| 2009/0207793 A1* | 8/2009 | Shen et al. | 370/329 |
| 2011/0194516 A1* | 8/2011 | Aiba et al. | 370/329 |
| 2012/0100864 A1* | 4/2012 | Susitaival et al. | 455/450 |

FOREIGN PATENT DOCUMENTS

| | | | |
|---|---|---|---|
| WO | WO 2009/021952 A2 | 2/2009 | |
| WO | WO 2010027035 A1 * | 3/2010 | H04W 72/04 |
| WO | WO 2011/098136 A1 | 8/2011 | |

OTHER PUBLICATIONS

3GPP TSG-RAN-WG1 Meeting#51bis, Sevilla, Spain, Jan. 14-18, 2008, R1-080121, "ACK/NACK repetition in E-UTRA uplink", Huawei, 4 pgs.
3GPP TSG-RAN WG1 Meeting #55, Nov. 10-14, 2008, Prague, Czech Republic, R1-084649, "LS on support of ACK/NACK repetition in Tel-8", 2 pgs.
3GPP TSG-RAN WG4 (Radio) Meeting #49bis, Ljubliana, Slovenia, Jan. 12-16, 2009, R4-090120, "ACK/NACK repetition times", Huawei, 3 pgs.

(Continued)

*Primary Examiner* — Omar Ghowrwal
(74) *Attorney, Agent, or Firm* — Harrington & Smith

(57) ABSTRACT

There is provided an method, apparatus for performing the method and a computer program product, wherein the method includes allocating to a terminal device multiple terminal device-specific physical uplink control channel resources for a transmission of a scheduling request from the terminal device, wherein the transmission of the scheduling request comprises multiple physical uplink control channel transmissions taking place on the allocated resources.

19 Claims, 3 Drawing Sheets

(56) References Cited

OTHER PUBLICATIONS

3GPP TSG RAN Wg1 Meeting #56, Athens, Greece, Feb. 9-13, 2009, R1-090558, 3GPP TSG RAN WG4 (Radio) Meeting #49bis, Ljubljana, Slovenia, Jan. 12-16, 2009, R4-090419, "ACK/NACK repetition factors (Response to LS R1-084649 on LS on support of ACK/NACK repetition in Rel-8)", 4 pgs.

3GPP TS36.213 V8.8.0 (Sep. 2009), "3rd Generation Partnership Project; Technical Specification group Radio Access Network; Evolved Universal Terrestrial Redo Access (E-UTRA); Physical layer procedures (Release 8)", 77 pgs.

ETSI TS 136 211 VI0.1.0 (Apr. 2011) LTE; Evolved Universal Terrestrial Radio Access (E-UTRA); Physical Channels and Modulation (3GPP TS 36.211 version 10.1.0 Release 10).

ETSI TS 136 213 V10.1.0 (Apr. 2011) LTE; Evolved Universal Terrestrial Radio Access (E-UTRA); Physical Layer Procedures (3GPP TS 36.213 version 10.1.0 Release 10).

ETSI TS 136 321 V10.1.0 (Apr. 2011) LTE; Evolved Universal Terrestrial Radio Access (E-UTRA); Medium Access Control (MAC) protocol specification (3GPP TS 36.321 version 10.1.0 Release 10).

ETSI TS 136 331 V10.1.0 (Apr. 2011) LTE; Evolved Universal Terrestrial Radio Access (E-UTRA); Radio Resource Control (RRC); Protocol specification (3GPP TS 36.331 version 10.1.0 Release 10).

* cited by examiner

| UE | PUCCH RESOURCE SEQUENCE | |
|---|---|---|
| | SUBFRAME #1 | SUBFRAME #2 |
| #1 | 1 | 1 |
| #2 | 2 | 2 |
| #3 | 3 | 4 |
| #4 | 4 | 3 |

FIG. 4

| UE | PUCCH RESOURCE SEQUENCE | |
|---|---|---|
| | SUBFRAME #1 | SUBFRAME #2 |
| #1 | 1 | 1 |
| #2 | 1 | 2 |
| #3 | 1 | 3 |
| #4 | 1 | 4 |
| #5 | 2 | 1 |
| #6 | 2 | 2 |
| #7 | 2 | 3 |
| #8 | 2 | 4 |
| #9 | 3 | 1 |
| #10 | 3 | 2 |
| #11 | 3 | 3 |
| #12 | 3 | 4 |
| #13 | 4 | 1 |
| #14 | 4 | 2 |
| #15 | 4 | 3 |
| #16 | 4 | 4 |

FIG. 5

| PUCCH RESOURCE | SUBFRAMES | | | |
|---|---|---|---|---|
| | #1 | #2 | ... | #N |
| #1 | | | | |
| #2 | | | | |
| ⋮ | | | | |
| #L | | | | |

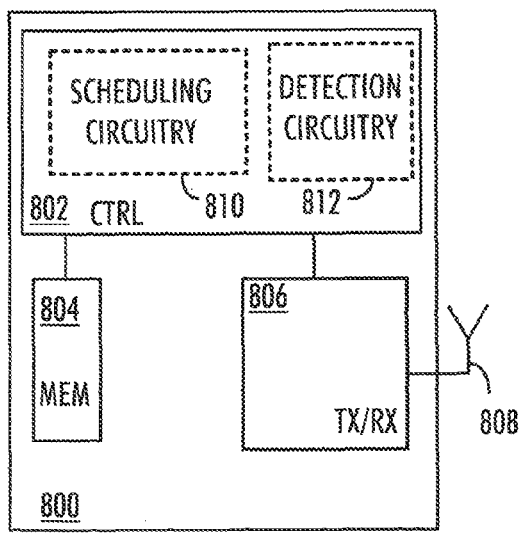
FIG. 7
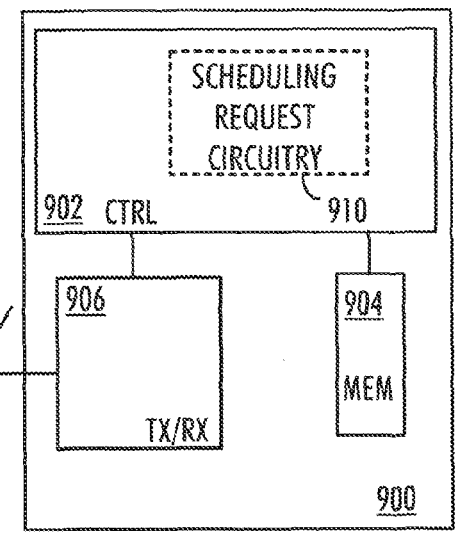
FIG. 8
FIG. 9
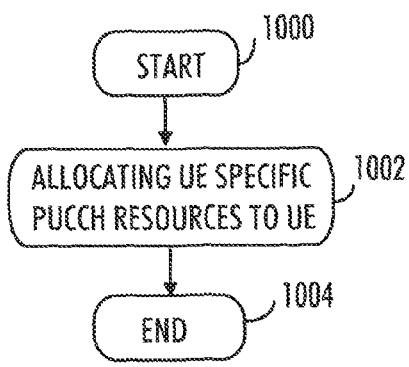
FIG. 10
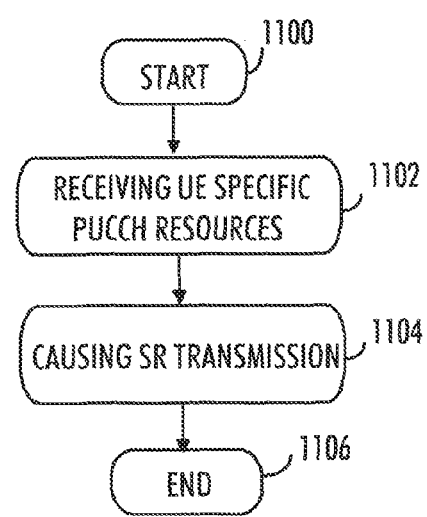
FIG. 11

SCHEDULING REQUEST ENHANCEMENTS

FIELD

The invention relates generally to mobile communication networks. More particularly, the invention relates to performing scheduling requests.

BACKGROUND

In radio communication networks, such as the Long Term Evolution (LTE) or the LTE-Advanced (LTE-A) of the 3$^{rd}$ Generation Partnership Project (3GPP), one of the features of an uplink (UL) system is the support of fast uplink scheduling request mechanism for the active mode (RRC_CONNECTED state) user equipment (UE) synchronized with the eNB (for UEs having valid timing advance (TA) but no valid UL grant on a physical uplink shred channel (PUSCH) available). The uplink scheduling request mechanism allows the UE to indicate the need for UL resource by means of scheduling request (SR) or a scheduling request indicator (SRI). As a response, a receiving base station, such as an evolved Node B (eNB), may grant the UL resource. A short UL latency is desirable as e.g. it affects TCP/IP acknowledgement (ACK) latency which in turn can affect effective throughput and ultimately the user friendliness of the network. In the LTE, the short latency may be achieved by supporting short SR resource periodicity. However, new "always-on" UE applications dramatically increase the number of UEs in active mode requiring SR resource allocation. This may cause capacity and coverage related problems. Thus, it is important to provide a solution for at least partially solving problems related to these issues.

BRIEF DESCRIPTION OF THE INVENTION

Embodiments of the invention seek to improve the coverage and capacity of the scheduling request.

According to aspects of the invention, there are provided methods, apparatuses, and computer program products as specified in the claims.

LIST OF DRAWINGS

In the following, the invention will be described in greater detail with reference to the embodiments and the accompanying drawings, in which FIG. 1 presents a signaling diagram for a scheduling request procedure;

FIGS. 4 to 6 illustrate PUCCH resource sequences according to embodiments;

FIG. 7 presents an exemplary situation of detecting the PUCCH resources according to an embodiment;

FIGS. 8 and 9 show two apparatuses according to embodiments; and

FIGS. 10 and 11 show two methods according to embodiments.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Radio communication networks, such as the Long Term Evolution (LTE) or the LTE-Advanced (LTE-A) of the 3$^{rd}$ Generation Partnership Project (3GPP), are typically composed of at least one base station (also called a base transceiver station, a Node B, or an evolved Node B, for example), a user equipment (also called a user terminal and a mobile station, for example) and optional network elements that provide the interconnection towards the core network. The base station connects the UEs via the so-called radio interface to the network.

A communication network may comprise a base station. The base station may provide radio coverage to a cell control radio resource allocation, perform data and control signaling, etc. The base station may be seen as one communication point of the network. The base station may be node B, evolved node B (eNB) as in LTE-A, a radio network controller (RNC), or any other apparatus capable of controlling radio communication and managing radio resources within the cell. The cell may be a macrocell, a microcell, or any other type of cell where radio coverage is present. Further, the cell may be of any size or form, depending on the antenna system utilized.

The eNB may establish a connection with a user equipment (UE) such as a mobile user terminal, a palm computer, or any other apparatus capable of operating in a mobile communication network. That is, the UE may perform data communication with the eNB.

In general, a base station applicable to the embodiments may be configured to provide communication services according to at least one of the following communication protocols: Worldwide Interoperability for Microwave Access (WiMAX), Universal Mobile Telecommunication System (UMTS) based on basic wideband-code division multiple access (W-CDMA), high-speed packet access (HSPA), LTE, and/or LTE-A. The base station may additionally provide the second generation cellular services based on GSM (Global System for Mobile communications) and/or GPRS (General Packet Radio Service). The present embodiments are not, however, limited to these protocols.

Figure 1:
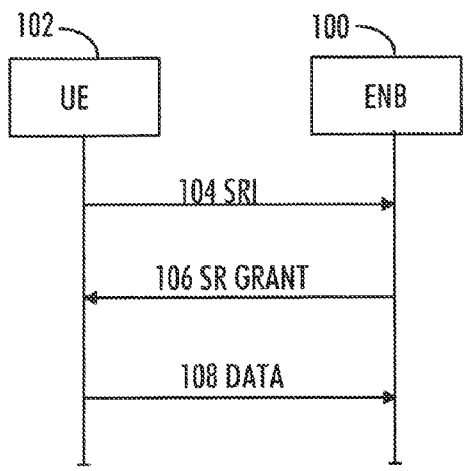
Figure 2:
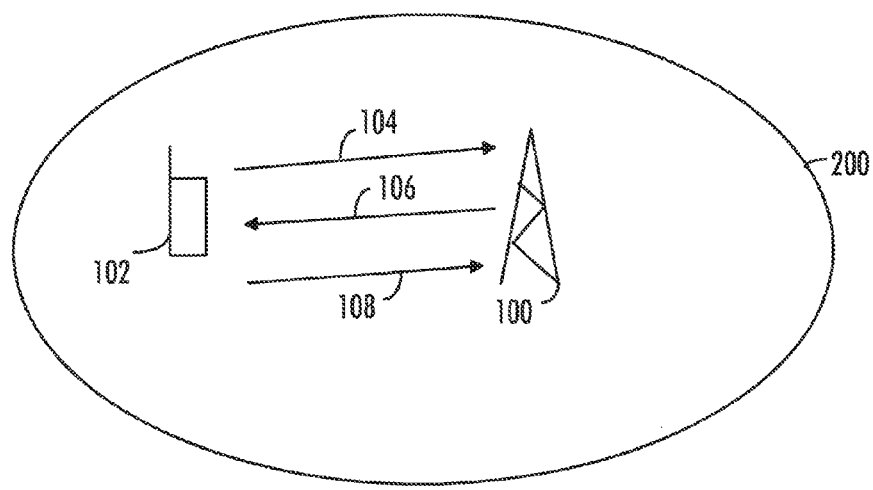
FIG. 2 shows a base station and a terminal device.

In the current LTE scheduling request procedure as shown in FIG. 1, the UE 102 may request an UL grant by transmitting the scheduling request (SR) 104 to the eNB 100. The scheduling request may also be called a scheduling request indicator (SRI). The eNB 100 may then allocate resources for the UE 102 to perform the uplink transmission. The eNB 100 may indicate the resources in an uplink scheduling grant 106. Thereafter, the UE 102 may transmit the data 108 to the eNB 100. The SR resource is allocated to the UE 102 via a higher layer signaling (radio resource control (RRC) layer). The RRC layer may be responsible for broadcasting and paging. It also may take care of RRC connection management, radio bearer control, mobility functions and UE measurement reporting and control. In FIG. 2 it is further shown that the eNB 100, providing radio access to a cell 200, may communicate with a user equipment (a terminal device) 102 as described with reference to FIG. 1.

The scheduling request may contain two states: a first one, i.e. a positive scheduling request, where the UE 102 requests to be scheduled and a second one, i.e. a negative scheduling request, where the UE 102 does not request to be scheduled. There could be also more than two states in certain use cases. The SR resources may be provided with a short periodicity. However, only positive scheduling requests (#1) are signaled. That is, the negative scheduling requests correspond to no transmission. This method is also called an on/off keying. The hybrid automatic repeat request (HARQ) ACK signal structure on a physical uplink control channel (PUCCH) is applied for the transmission of the scheduling request indicator. The PUCCH applied for the SR transmission follows the PUCCH format 1. PUCCH format 1 transmission consists of transmission of a predefined sequence. The sequence may be comprised of a first element sequence that is repeated and modulated with a second element sequence called an orthogonal cover code. Alternatively, the repeated first element sequences may be modulated with multiple concatenated orthogonal cover codes, dividing the overall predefined sequence into concatenation of two sequences, corresponding to data and pilot parts. Assignment of a PUCCH format 1/1a/1b resource means assignment of a predefined sequence and a physical resource block (PRB) for the transmission of the sequence. The main difference between the ACK/negative ACK (NACK) format (PUCCH format 1a/1b) and the SR format, is that with the SR, the data part is not modulated with an ACK/NACK symbol.

It is also possible to have a concurrent transmission of the SR and the HARQ-ACK. When frequency division duplexing (FDD) is applied, both the ACK/NACK and the SR are transmitted in the same sub-frame. The UE may in this case transmit the ACK/NACK on its assigned ACK/NACK PUCCH format 1a/1b resource for a negative SR transmission and transmit the ACK/NACK on its assigned SR PUCCH format 1/1a/1b resource for a positive SR transmission. This way, a single transmission of the ACK/HACK simultaneously indicates a possible scheduling request to the eNB.

However, shorter SR periodicities required for UL latency reduction, as well as increasing number of UEs with the "always-on" applications may dramatically increase the amount of required SR resources. This may lead to large PUCCH overhead from the scheduling requests alone. For example, the LTE release 10 (Rel-10) with typical configuration supports only 18 resources per one physical resource block (PRB).

In addition, the SR coverage is also an issue. The ACK/NACK repetition with subframe repetition factor 2, 4, or 6 has been agreed to enhance coverage. The repetition is supported only for PUCCH Format 1a/b carrying HARQ-ACK bits but it is not supported for PUCCH Format 1 that carries the SR. It should also be noted that 1% miss-detection of the PRACH format 2 is reached around −11.67 dB SNR, but 1% miss-detection for PUCCH format 1a is achieved around −7.3 dB SNR without repetition. Thus, the miss-detection performance for the SR transmitted in PUCCH format 1 is about 4 dB worse than for the PRACH. The SR miss-detection rate is about 10% at −12 dB SNR. This higher miss-detection rate implies also increase in the latency distribution as multiple transmissions may be required to get the scheduling request through.

Thus, it is proposed that multiple terminal device-specific physical uplink control channel (PUCCH) resources are allocated to a user terminal for a transmission of a scheduling request (SR) from the terminal device, wherein the transmission of the scheduling request comprises multiple PUCCH transmissions taking place on the allocated resources. In other words, the single SR is composed of transmissions of multiple (bundled) PUCCH transmissions. In prior art, the UE sends the SR as a single PUCCH transmission on a given resource, waits for the UL grant (as depicted in FIG. 1), and if no response, repeats the SR transmission as a single PUCCH transmission on the same resource. In the proposed solution, a single SR is transmitted as multiple PUCCH transmission straight away.

The applied PUCCH format may be the format 1. As explained earlier with respect to the on/off keying, also the bundled PUCCH transmissions take place only in the case of a positive SR. The bundled transmission of SR may both aid in obtaining better coverage of the SR and in improving the capacity of the system, as will be explained.

Figure 3:
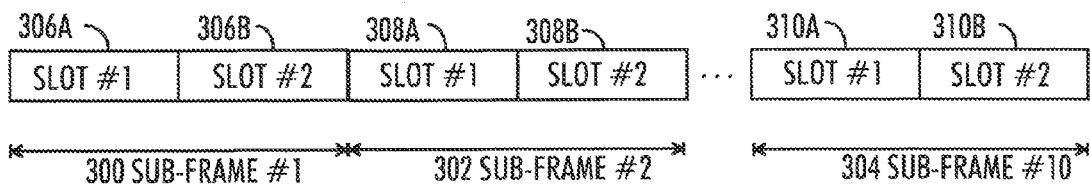
FIG. 3 shows a frame structure according to an embodiment.

An exemplary frame structure is shown in FIG. 3. Each sub-frame 300, 302 and 304 may consist of two time slots. Thus, the sub-frame 300 may have two time-slots 306A and 306B, the sub-frame 302 may have two time-slots 308A and 308B, and the sub-frame 304 may have two time-slots 310A and 310B. In the LTE, the duration of a time slot is 0.5 ms, and a radio frame comprises ten sub-frames. Thus, one radio frame may have a duration of 10 ms. The RRC layer may be responsible of allocating the UE-specific PUCCH resources for the SR transmission. The UE-specific resources denote that each UE is configured a sequence (or signature) of PUCCH format 1/1a/1b resources. One possible implementation is such that the eNB 100 configures separate SR resources for the bundled PUCCH format 1 transmission using separate resource indexes.

In an embodiment, the terminal device-specific physical uplink control channel resources are on a plurality of sub-frames 300 to 304. That is, a plurality of PUCCHs is transmitted on at least two sub-frames 300 to 304, thus corresponding to a bundled transmission. The eNB 100 may allocate the resources for the UE 102 to transmit the SR so that the bundled allocated resources are in sub-frames 1, 5 and 7 of a radio frame having 10 sub-frames, for example. Any other combination of sub-frames is also possible. This option allows more freedom in allocation of the resources.

In an embodiment, the plurality of subframes comprises consecutive sub-frames 300 to 304. In an embodiment the plurality of subframes 300 to 304 comprises only consecutive subframes. This option provides resource patterns that are most easily detectable by the eNB 100 as the channel coherence time is typically not exceeded with the bundled SR transmission comprising only consecutive subframes. In other words, the propagation channel properties remain substantially the same during one bundled SR transmission. If non-consecutive subframes were used for the bundled transmission and the applied subframes were far (for example, separated by more than the channel coherence time) from each other, the channel conditions may change during the bundled transmission and a correct reception may be more difficult.

In another embodiment, the terminal device-specific PUCCH resources are within a same sub-frame 300, 302 or 304. In this option the PUCCH format 1/1a/1b resource portion within one slot 306A/B, 308A/B or 310A/B is considered as a whole PUCCH resource and UE 102 is allocated resources on consecutive slots 306A and B, 308A and B or 310A and B. The allocated resources in the consecutive slots may be the same resources (i.e. having same resource index within the slots) or different resources. The configured resources may be on different PRBs or, said more generally, on different PUCCH format 1/1a/1b resource sets. These sets may be transparent to the UE 102.

In an embodiment, when the bundled PUCCH format 1 transmissions are used to enhance SR coverage, the corresponding PUCCH resources are allocated exclusively (exclusively reserved) to the UE in question. This corresponds to a transmission time interval (TTI) bundling applied to PUCCH format 1. In this option, the PUCCH resources are allocated exclusively to a specific terminal device such that within any of the sub-frames 300 to 304 there is no overlap of allocated resources between the specific terminal device and any other terminal device. As an example, let us assume four PUCCH resources {1, 2, 3, 4} in two (consecutive or non-consecutive) subframes {1, 2}. The configuration of the PUCCH resource sequences (=SR sequences) are shown in FIG. 4, where different UEs #1 to #4 are each allocated a UE-specific SR sequence of PUCCH resources. For the UE #1, a sequence of 1-1 is allocated, meaning that the UE #1 transmits its SR as a bundled transmission in two subframes (#1 and #2) using a resource with index 1 (resource 1) in the subframe #1 and a resource with index 1 in the subframe #2. The resource with index 1 may be a specific predefined resource in the subframe. UE #3 has a PUCCH resource sequence of 3-4 allocated meaning that a resource 3 is used in the subframe #1 and a resource 4 is used in the subframe #2. It can be seen that for any subframe, one resource {1, 2, 3, or 4} is allocated for only one UE. Therefore the risk of miss-detection is relatively small and the reception is straight forward. If the eNB 100, when receiving the SR, detects that a specific subframe, for example the subframe #1, carries a positive PUCCH in a specific resource, for example in the resource 1, then the eNB 102 may decide that the UE #1 has transmitted the SR. As said, with this embodiment the coverage of the SR is increased as the eNB needs to detect only one sub-frame correctly in order to identify which UE has transmitted the SR. Alternatively, the eNB 100, when receiving the SR, correlates the received signal over multiple subframes, for example the subframes #1 and #2, with the assigned sequences, for example sequences #1 and #2, before deciding whether the UE#1 has transmitted the SR or not. Hence, the decision is based on larger collected signal energy, thus, improving the coverage of the SR.

In an embodiment, the UE may cancel an ongoing (bundled) scheduling request transmission in case an uplink scheduling grant is received from the network, such as from the eNB. In other words, UE starts SR transmission as bundled PUCCH transmission on multiple subframes but receives UL resource allocation grant during the bundled PUCCH transmission. The eNB may thus have identified the UE who is transmitting the bundled SR before the bundled SR transmission is completed. Thus, the identification of the UE is based on a part of the ongoing SR transmission. As consequence, the eNB may already at this point assign the SR grant to the UE and the UE may cancel the (bundled) SR by stopping the bundled PUCCH transmission on a slot or a subframe boundary without finishing the sequence of PUCCH transmissions. This avoids also potential problems of simultaneous transmission of PUSCH and PUCCH.

In an embodiment, when SR multiplexing capacity is enhanced, the same PUCCH format 1 resources are allocated to multiple UEs (overbooked). However, each terminal device is given a unique sequence of the physical uplink control channel resources. That is, the sequence of PUCCH resources is unique for each UE such that it differs at least by one PUCCH resource from the PUCCH resource sequences allocated to other UEs. As an example, let us assume again four PUCCH resources {1, 2, 3, 4} in two (consecutive or non-consecutive) subframes {1, 2}. The configuration of the PUCCH resource sequences (=SR sequences) are shown in FIG. 5, where different UEs #1 to #16 are each allocated a UE-specific sequence of PUCCH resources. From FIG. 5 it can be seen that the same resource in one subframe can be used by many UEs. For example, a resource with index 3 in the subframe #1 is used by UEs #9 to #12. This poses challenges for the receiver (eNB) but allows for more efficient capacity usage.

The capacity enhancing embodiment improves considerably the PUCCH Format 1 multiplexing capacity. Let us assume that the bundled PUCCH Format 1 resource sequence has length N (denoting that the transmission occurs in N consecutive or non-consecutive subframes) and the resources are assigned to each UE from a pool of L resources per subframe. This is shown in FIG. 6 where a UE #1 has been allocated a sequence marked with a solid line whereas a PUCCH sequence allocated for a UE #2 is shown with a dashed line. It can be seen that the sequences differ by at least one resource making them distinguishable at the receiver (eNB). Assuming the pool of L resources from which the sequences of length N are selected, as many as $L^N$ UEs may be allocated a unique sequence. This is a remarkable improvement over conventional methods, where at maximum L×N allocations are supported.

It is clear that the multiplexing capacity increases with increasing resource pool size L and sequence length N. However, the selection of L and N may also be limited. For example, the sequence length N is limited because when the PUCCH format 1 resource sequence is formed over subframes, it can limit the minimum SR periodicity. Additionally, as the resource sequences for separate UEs may differ only by one resource, long sequence lengths can degrade receiver missed detection and/or false alarm performance and hence reduce the feasible cell coverage.

As another example, the resource pool size L is limited because the receiver is most sensitive to make erroneous decisions (either false alarms or missed detections) when multiple UEs send simultaneously positive SRs within the same resource pool. Probability of such occasions increases with increasing L. In other words, receiver performance sets upper limits to feasible size of L. Further, the performance will also be limited by the number of UEs that are being mapped to the same resources. FIG. 7 shows an example of a situation where false alarms and/or missed detections are possible. In FIG. 7 the eNB has detected PUCCH resources #1 and #2 as positive (marked with a circle) in two (consecutive or non-consecutive) subframes #1 and #2, meaning that PUCCH is transmitted on those resources on both subframes. However, the receiver may have troubles in identifying the UE or those UEs that transmitted the SR. As two resources are occupied on two sub-frames, there are altogether four possible combinations of PUCCH resource sequences: 1-1, 1-2, 2-1, and 2-2. If these combinations are allocated to four different UEs, then basically any of these UEs may have transmitted the SR. On the other hand, it is noted that the problem exists only with positive SRs. It can be assumed that in a typical operation point, the probability of transmitting positive SR is fairly small (on the order of 1%).

As one mitigation solution to this, the eNB 100 may divide the pool of PUCCH resources (comprising the resources available for generating the unique sequences) such that only a predetermined portion of the pool is available for a predetermined group of terminal devices. This way, collisions over both L and N become marginal.

In an embodiment, the eNB 100 may allocate the PUCCH resources to UEs such that a maximum distance between each possible unique sequence is obtained, while subsequent allocations gradually increase the probability of collisions/misdetections. This may depend on how many UEs there are. In case there are more possible multiplexing resources than there are UEs configured for SR, the eNB 100 may at first step decide to allocate resources in manner shown in FIG. 4 (i.e. so that one resource is allocated in one subframe by only one UE). In the second step, further SR sequences may be generated in manner as shown in FIGS. 5 and 6 (i.e. so that one resource may be allocated in one subframe for many UEs). As a further step, the eNB 100 may decide to allocate PUCCH resource sequences such that the PUCCH resources selected for a specific terminal device are as far as possible from the PUCCH resource sequence allocations of other terminal devices. For example, in case of five UEs, four PUCCH resources {1, 2, 3 and 4} and N=2, the allocated sequences may be 1-1, 2-2, 3-3, 4-4 and 1-3. Thus, instead of selecting 1-2 for the fifth PUCCH sequence, 1-3 is selected. This is because 1-3 is more distant from 1-1 than 1-2 would be. Thus, the maximum resource distance between the allocated resources may be obtained.

In any case, care must be applied when selecting appropriate N and L values. According to an embodiment, it has been found that suitable values for N and L may be 2 and 4 to 9, respectively.

In an embodiment, the embodiments of FIG. 4 and FIG. 5 are both applied by the eNB. In other words, some group of UEs may be allocated a SR sequence according to the embodiment of FIG. 4 (coverage enhancement) whereas another group of UEs may be allocated a SR sequence according to the FIG. 5 embodiment (capacity enhancement). This allows for flexible response to different requirements within the network.

In an embodiment, the receiver, such as the eNB 100 of FIGS. 1 and 2, identifies at least one terminal device which has transmitted a scheduling request, wherein the identification is based on the detected at least one unique sequence. Thus, the decision is based on the presence of positive SR signals per PUCCH resources. Based on the positive SR detections, eNB identifies detected SR sequence(s) and corresponding UE(s).

In case there is only one sequence to be detected, the UE corresponding to the sequence is detected is the one who transmitted the SR. In case when a signaling request sequence corresponding to none of the allocated SR sequences is detected, then a miss-detection has occurred. This embodiment may correctly detect all scheduling requests which differ in one subframe, such as sequences 1-1 and 1-2. The detection is more cumbersome where multiple PUCCH resources have been detected in each of, for example, two subframes.

In an embodiment, when multiple physical uplink control channel resources are detected as positive in at least one subframe implying that scheduling requests have been transmitted from at least two terminal devices, the receiver may first estimate the channel $c^s_{I,n}$ for each positive physical uplink control channel resource in each time slot. In $c^s_{I,n}$, s denotes for the time slot, I for the resource index, and n for the subframe index (or the sequence index). This estimation of the channel may be done for each receiver antenna branch, as the case may be. The estimation gives indication of the channel condition for the specific resource index I.

The eNB may then assume that the number M of terminal devices who have transmitted the scheduling request, equals to the maximum number of detected positive physical uplink control channel resources per sub-frame. In other words, the number of detected positive SR sequences (M) is set to maximum number of positive SR signals detected per subframe. Such an assumption is made as it is likely that the number of positive PUCCH resources in a subframe corresponds to the number UEs who transmitted the SR. This narrows the number of UEs who are to be identified as having transmitted the SR. As an example, if two positive PUCCH resource detections are done in the subframe #1 and only one detection in sub-frame #2, then M=2.

In the next phase a candidate set is determined, wherein the candidate set comprises all allocated sequences of the physical uplink control channel resources that fit to the detected positive physical uplink control channel resources in each subframe. Thus, if, for a subframe #1, PUCCH resources 1 and 3 are detected as positive, and for subframe #2, PUCCH resources 1, 2, and 3 are detected as positive, then possible combinations are 1-1, 1-2, 1-3, 3-1, 3-2, and 3-3. If each of these has been allocated to some UE, then all of these are included in the candidate set. Said differently, if, for the first subframe, PUCCH resources 1 and 3 are detected as positive, then all allocated sequences having either resource 1 or resource 3 applied in the first subframe are selected in the candidate set. Then, the next subframe is checked and if some of these currently selected sequences do not fit to the PUCCH resources detected as positive in this next subframe, the sequence is dropped from the candidate set.

The eNB may then determine a decision variable for each sequence of the candidate set. The decision variable is determined by taking a correlation per slot (due to slot-wise frequency hopping in PUCCH) and per receive antenna between the channel estimates and summing the per slot correlations. In other words, the correlations (per sequence) are summed over both slots (and over multiple receive antenna branches in the eNB, as the case may be) and real part of the sum may be taken. The correlation is calculated between those subframes where a positive PUCCH resource has been detected. In case of two consecutive subframes, the correlation is calculated between the two consecutive subframes. That is, for this case of two consecutive subframes #1 and #2 and a PUCCH resource sequence of 1-2, the decision variable is calculated as real($\text{conj}(c^1_{1,1})c^1_{2,2}+\text{conj}(c^2_{1,1})c^2_{2,2}$). For a case of three consecutive subframes #1, #2 and #3 and a PUCCH resource sequence of 1-2-4, the decision variable is calculated as: real($\text{conj}(c^1_{1,1})c^1_{2,2}+\text{conj}(c^2_{1,1})+c^2_{2,2}$ $\text{conj}(c^1_{2,2})c^1_{4,3}+\text{conj}(c^2_{2,2})c^2_{4,3}$), that is, it contains a sum of correlations between the consecutive subframe pairs. Thus, a real decision variable is obtained. The detection metric relies on reasonable channel coherence over the detected subframes to identify right UEs.

The eNB may then select M sequences having the largest decision variables, wherein the selected M sequences respectively correspond to M terminal devices. This way, UEs who transmitted the SR may be identified. This embodiment identifies only two UEs in the example of FIG. 7. This is due to the assumption that M UEs transmit positive SRs which greatly simplifies the computational burden of the eNB.

In another embodiment, no such assumption of M UEs is made and the eNB may identify as many as four UEs in the example of FIG. 7, that is, all possible combinations. In this embodiment, the eNB 100, as one possible receiver, may estimate the channel for each physical uplink control channel resource that has been allocated to any terminal device in each time slot. Further, in this embodiment, the eNB 100 determines a candidate set, wherein the candidate set comprises all allocated sequences, not only those that fit to the detected sequence. Then, the eNB 100 may determine a decision variable in the same way as in the previous for each sequence of the candidate set. In other words, in this receiver option, the channel is estimated per slot (or received signal is correlated with SR signature over the slot) for each allocated PUCCH format 1 resource in the resource pool of size L. (This is also done for each receive antenna branch in eNB). After that, correlation between channel estimates is calculated over consecutive or non-consecutive subframes for each allocated sequence (sequences of the candidate set). Correlations (per sequence) are summed over both slots (and over multiple receive antenna branches in eNB) and real part of the sum is taken to obtain the decision variable for each SR sequence.

This requires more computation from the receiver but allows for more detections of scheduling request to take place simultaneously.

Based on this, the eNB 102 may then determine that a sequence from a specific terminal device is detected when the decision variable exceeds a predetermined threshold. The value of the predetermined threshold may be selected on the basis of estimated background noise level adjusted possibly with collected statistics on realized false alarm rate.

Each embodiment for the detection as shown above may correctly (i.e., without increasing the false alarm rate) detect multiple simultaneous positive SR sequences where part of the SR resources are overlapping/colliding, such as sequences of PUCCH resources {1, 1, 1} and {1, 1, 2}.

As from the UE point of view, the UE may receive allocation of multiple terminal device-specific PUCCH resources and then cause transmission of a single scheduling request, wherein the transmission comprises multiple PUCCH transmissions taking place on the allocated resources. This ensures enhanced coverage of the scheduling request and/or enhanced SR capacity of the network.

An embodiment provides an apparatus 800, as shown in FIG. 8, comprising at least one processor 802 and at least one memory 804 including a computer program code, wherein the at least one memory 804 and the computer program code are configured, with the at least one processor 802, to cause the apparatus 800 to carry out any one of the above-described processes relating to allocating the PUCCH resources or to detecting the received sequence. FIG. 8 shows only the elements and functional entities required for understanding the apparatus 800. Other components have been omitted for reasons of simplicity. The implementation of the elements and functional entities may vary from that shown in FIG. 8. The connections shown in FIG. 8 are logical connections, and the actual physical connections may be different. The connections can be direct or indirect and there can merely be a functional relationship between components. It is apparent to a person skilled in the art that the apparatus 800 may also comprise other functions and structures.

The apparatus 800 may be comprised in a base station (also called a base transceiver station, a Node B, or an evolved Node B, for example), e.g. the apparatus 800 may comprise a circuitry, e.g. a chip, a processor, a micro controller, or a combination of such circuitries in the base station and cause the base station to carry out the above-described functionalities.

The processor 802 may be implemented with a separate digital signal processor provided with suitable software embedded on a computer readable medium, or with a separate logic circuit, such as an application specific integrated circuit (ASIC). The processor 802 may comprise an interface, such as computer port, for providing communication capabilities. The processor 802 may be, for example, a dual-core processor or a multiple-core processor. The memory 804 may be connected to the processor 802. However, memory may also be integrated to the processor 802 and, thus, no memory 804 may be required. The memory may be used to store information regarding the PUCCH resource allocations per UE, for example. The apparatus 800 may further comprise a transceiver (TRX) 806. The TRX 806 may further be connected to one or more antennas 808 enabling connection to and from an air interface. The TRX 806 may be used in transmission of radio resource layer configuration messages, such as the PUCCH allocations, to the terminal devices and in signaling related to the scheduling requests.

The processor 802 may comprise a scheduling circuitry 810 for performing the activities related to the scheduling of PUCCH resources to the UEs. The scheduling circuitry 810 may thus keep track of the PUCCH resource sequences that have been allocated to UEs. The processor 802 may comprise a detection circuitry 812 for detecting the scheduling requests from the UEs. The detection circuitry 812 may thus perform the any of the functionalities for correctly detecting the received SRs and identifying which UE has transmitted the SR, as described above.

According to an embodiment, there is provided an apparatus 900, as shown in FIG. 9, comprising at least one processor 902 and at least one memory 904 including a computer program code, wherein the at least one memory 904 and the computer program code are configured, with the at least one processor 902, to cause the apparatus 900 to carry out any one of the above-described processes relating to the reception of the PUCCH resource allocation and transmission of the scheduling request according to the given PUCHH resource sequence. FIG. 9 shows only the elements and functional entities required for understanding the apparatus 900. Other components have been omitted for reasons of simplicity. The implementation of the elements and functional entities may vary from that shown in FIG. 9. The connections shown in FIG. 9 are logical connections, and the actual physical connections may be different. The connections can be direct or indirect and there can merely be a functional relationship between components. It is apparent to a person skilled in the art that the apparatus 900 may also comprise other functions and structures.

The apparatus 900 may be a terminal device of a cellular communication system, e.g. a computer (PC), a laptop, a tabloid computer, a cellular phone, a communicator, a smart phone, a palm computer, or any other communication apparatus. In another embodiment, the apparatus is comprised in such a terminal device, e.g. the apparatus may comprise a circuitry, e.g. a chip, a processor, a micro controller, or a combination of such circuitries in the terminal device and cause the terminal device to carry out the above-described functionalities.

The processor 902 may be implemented with a separate digital signal processor provided with suitable software embedded on a computer readable medium, or with a separate logic circuit, such as an application specific integrated circuit (ASIC). The processor 902 may comprise an interface, such as computer port, for providing communication capabilities. The processor 902 may be, for example, a dual-core processor or a multiple-core processor. The memory 904 may be connected to the processor 902. However, memory may also be integrated to the processor 902 and, thus, no memory 904 may be required. The memory may be used to store information regarding the PUCCH resource allocations, for example. The apparatus 900 may further comprise a transceiver (TRX) 906. The TRX 906 may further be connected to one or more antennas 908 enabling connection to and from an air interface. The TRX 906 may be used in the signaling processes related to the scheduling request.

The processor 902 may comprise a scheduling request circuitry 910 for performing the activities related to the transmission of scheduling request by using the allocated PUCCH resources.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

FIG. 10 shows a method for allocating the PUCCH resources to a terminal device. The method starts in step 1000. In step 1002 the method comprises allocating multiple terminal device-specific physical uplink control channel resources to a terminal device for a transmission of a scheduling request from the terminal device, wherein the transmission of the scheduling request comprises multiple physical uplink control channel transmissions taking place on the allocated resources. The method ends in step 1004.

FIG. 11 shows a method for transmitting a scheduling request from a terminal device. The method starts in step 1100. In step 1102, the method comprises receiving allocation of multiple terminal device-specific physical uplink control channel resources. In step 1104 the terminal device causes a transmission of a scheduling request, wherein the transmission comprises multiple physical uplink control channel transmissions taking place on the allocated resources. The method ends in step 1106.

The embodiments offer many advantages. The embodiments provides, for example, considerable improvement on SR multiplexing capacity with acceptable degradation on the SR detection sensitivity, enhanced SR coverage in parallel with HARQ-ACK and PRACH coverage, bundled SR transmissions being flexibly multiplexed with legacy UE's SR transmissions as well as with PUCCH format 1a/1b carrying HARQ-ACK within the same PRB, and the bundled SR transmissions targeted to enhance SR coverage performance or SR multiplexing capacity being flexibly multiplexed e.g. within the same PRB. It should also be noted that a standardization impact is small, imposing no restrictions on already existing features, like simultaneous transmission of HARQ-ACK and positive SR.

The techniques and methods described herein may be implemented by various means. For example, these techniques may be implemented in hardware (one or more devices), firmware (one or more devices), software (one or more modules), or combinations thereof. For a hardware implementation, the apparatuses of FIGS. 8 and 9 may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus for performing any of the tasks of FIGS. 1 to 11 comprises processing means for carrying out embodiments of the present invention. Accordingly, the at least one processor, the memory, and the computer program code form an embodiment of processing means. For example, the apparatus may comprise processing means for allocating to a terminal device multiple terminal device-specific physical uplink control channel resources for a transmission of a scheduling request from the terminal device, wherein the transmission of the scheduling request comprises multiple physical uplink control channel transmissions taking place on the allocated resources. In another embodiment, the apparatus may comprise processing means for receiving allocation of multiple terminal device-specific physical uplink control channel resources, and causing a transmission of a scheduling request, wherein the transmission comprises multiple physical uplink control channel transmissions taking place on the allocated resources.

The processes or methods described in FIGS. 1 to 11 may also be carried out in the form of a computer process defined by a computer program. The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. A method, comprising:
   allocating to a terminal device multiple terminal device-specific physical uplink control channel resources for a transmission of a scheduling request from the terminal device, wherein the terminal device-specific physical uplink control channel resources are in a plurality of subframes or in a same subframe, and wherein the transmission of the scheduling request comprises multiple physical uplink control channel transmissions taking place on the allocated resources;
   allocating the physical uplink control channel resources to multiple terminal devices, wherein each terminal device is given a unique sequence of the physical uplink control channel resources, wherein each unique sequence differs at least by one physical uplink control channel resource from another sequence, and
   dividing a pool of physical uplink control channel resources comprising the resources available for generating the unique sequences such that only a predetermined portion of the pool is available for a predetermined group of terminal devices.

2. The method of claim 1, wherein the terminal device-specific physical uplink control channel resources are on a plurality of subframes.

3. The method of claim 1, wherein the terminal device-specific physical uplink control channel resources are on a plurality of subframes and the plurality of subframes comprise consecutive subframes.

4. The method of claim 1, wherein the terminal device-specific physical uplink control channel resources are within a same subframe.

5. The method of claim 1, further comprising:
allocating the physical uplink control channel resources exclusively to a specific terminal device such that within a subframe there is no overlap of allocated resources between the specific terminal device and any other terminal device.

6. The method of claim 1, further comprising:
allocating the physical uplink control channel resources to multiple terminal devices, wherein each terminal device is given a unique sequence of the physical uplink control channel resources, wherein each unique sequence differs at least by one physical uplink control channel resource from another sequence.

7. The method of claim 1, further comprising:
identifying at least one terminal device which has transmitted a scheduling request, wherein the identification is based on a detected at least one unique sequence of the physical uplink control channel resources.

8. The method of claim 1, further comprising, when multiple physical uplink control channel resources are detected as positive in at least one subframe implying that scheduling requests have been transmitted from at least two terminal devices:
estimating the channel for each positive physical uplink control channel resource in each time slot;
applying an assumption that the number M of terminal devices having transmitted the scheduling request equals to the maximum number of detected positive physical uplink control channel resources per subframe;
determining a candidate set, wherein the candidate set comprises all allocated sequences of the physical uplink control channel resources that fit to the detected positive physical uplink control channel resources in each subframe;
determining a decision variable for each sequence of the candidate set, wherein the decision variable is determined by taking a correlation per slot between the channel estimates and summing the per slot correlations; and
selecting M sequences having the largest decision variables, wherein the selected M sequences respectively correspond to M terminal devices.

9. The method of claim 1, further comprising, when multiple physical uplink control channel resources are detected as positive in at least one subframe, implying that scheduling requests have been transmitted from at least two terminal devices:
estimating the channel for each physical uplink control channel resource that has been allocated to any terminal device in each time slot;
determining a candidate set, wherein the candidate set comprises all allocated sequences of the physical uplink control channel resources;
determining a decision variable for each sequence of the candidate set, wherein the decision variable is determined by taking a correlation per slot between the channel estimates and summing the per slot correlations; and
determining that a sequence from a specific terminal device is detected when the decision variable of that sequence exceeds a predetermined threshold.

10. An apparatus, comprising:
at least one processor and at least one memory including a computer program code, wherein the at least one memory and the computer program code are configured to, with the at least one processor, cause the apparatus at least to:
allocate to a terminal device multiple terminal device-specific physical uplink control channel resources for a transmission of a scheduling request from the terminal device, wherein the terminal device-specific physical uplink control channel resources are in a plurality of subframes or in a same subframe, and wherein the transmission of the scheduling request comprises multiple physical uplink control channel transmissions taking place on the allocated resources;
allocate the physical uplink control channel resources to multiple terminal devices, wherein each terminal device is given a unique sequence of the physical uplink control channel resources, wherein each unique sequence differs at least by one physical uplink control channel resource from another sequence, and
divide a pool of physical uplink control channel resources comprising the resources available for generating the unique sequences such that only a predetermined portion of the pool is available for a predetermined group of terminal devices.

11. The apparatus of claim 10, wherein the terminal device-specific physical uplink control channel resources are on a plurality of subframes.

12. The apparatus of claim 10, wherein the terminal device-specific physical uplink control channel resources are on a plurality of subframes and the plurality of subframes comprise consecutive subframes.

13. The apparatus of claim 10, wherein the terminal device-specific physical uplink control channel resources are within a same subframe.

14. The apparatus of claim 10, wherein the apparatus is further caused to:
allocate the physical uplink control channel resources exclusively to a specific terminal device such that within a subframe there is no overlap of allocated resources between the specific terminal device and any other terminal device.

15. The apparatus of claim 10, wherein the apparatus is further caused to:
allocate the physical uplink control channel resources to multiple terminal devices, wherein each terminal device is given a unique sequence of the physical uplink control channel resources, wherein each unique sequence differs at least by one physical uplink control channel resource from another sequence.

16. The apparatus of claim 10, wherein the apparatus is further caused to:
identify at least one terminal device which has transmitted a scheduling request, wherein the identification is based on a detected at least one unique sequence of the physical uplink control channel resources.

17. The apparatus of claim 10, wherein, when multiple physical uplink control channel resources are detected as positive in at least one subframe implying that scheduling requests have been transmitted from at least two terminal devices, the apparatus is further caused to:

estimate the channel for each positive physical uplink control channel resource in each time slot;

apply an assumption that the number M of terminal devices having transmitted the scheduling request equals to the maximum number of detected positive physical uplink control channel resources per subframe;

determine a candidate set, wherein the candidate set comprises all allocated sequences of the physical uplink control channel resources that fit to the detected positive physical uplink control channel resources in each subframe;

determine a decision variable for each sequence of the candidate set, wherein the decision variable is determined by taking a correlation per slot between the channel estimates and summing the per slot correlations; and select M sequences having the largest decision variables, wherein the selected M sequences respectively correspond to M terminal devices.

18. The apparatus of claim 10, wherein, when multiple physical uplink control channel resources are detected as positive in at least one subframe implying that scheduling requests have been transmitted from at least two terminal devices, the apparatus is further caused to:

estimate the channel for each physical uplink control channel resource that has been allocated to any terminal device in each time slot;

determine a candidate set, wherein the candidate set comprises all allocated sequences of the physical uplink control channel resources;

determine a decision variable for each sequence of the candidate set, wherein the decision variable is determined by taking a correlation per slot between the channel estimates and summing the per slot correlations; and determine that a sequence from a specific terminal device is detected when the decision variable of that sequence exceeds a predetermined threshold.

19. A computer program product embodied on a non-transitory computer program medium readable by a computer and comprising program instructions which, when loaded into an apparatus, execute the method according to claim 1.

* * * * *